United States Patent
Fancy

[11] 3,749,418
[45] July 31, 1973

[54] VEHICLE OCCUPANT RESTRAINING BELT ARRANGEMENT

[75] Inventor: Richard E. Fancy, Rochester, Mich.

[73] Assignee: General Motors Corporation, Detroit, Mich.

[22] Filed: Sept. 27, 1971

[21] Appl. No.: 183,871

[52] U.S. Cl. .......................................... 280/150 SB
[51] Int. Cl. .......................................... B60r 21/10
[58] Field of Search ................... 280/150 SB, 150 B; 297/385, 389, 388

[56] References Cited
UNITED STATES PATENTS

| | | | |
|---|---|---|---|
| 3,583,726 | 6/1971 | Lindblad | 280/150 SB |
| 3,679,229 | 7/1972 | Weststrate | 280/150 SB |
| 3,506,083 | 4/1970 | Botnick | 280/150 SB |

*Primary Examiner* — Leo Friaglia
*Assistant Examiner* — Robert R. Song
*Attorney* — W. E. Finken

[57] ABSTRACT

A restraining belt arrangement for a rear seat occupant of a two door type vehicle body that includes a front seat whose seat back is pivotally movable between a forwardly tipped easy-enter position and a generally vertical seating position. An elongated support member has a first end pivoted to the rear side of the front seat back and a second end attaching the outboard end of a restraining belt whose inboard end is secured to the vehicle body adjacent an inboard portion of the rear seat. During rearward pivotal movement of the front seat back to the seating position, a spring pivots the support member to a rearwardly extending position where the second end of the support member engages an outboard vehicle body portion and disposes the restraining belt in a generally laterally extending rear occupant restraining position without any deliberate effort on the part of the occupant. A latch mechanism on the support member includes a retractable bolt selectively engageable with the outboard vehicle body portion such that the support member secures the restraining belt in the restraining position while concomitantly positioning and supporting the front seat back in the seating position. Upon unlatching of the latch mechanism and subsequent forward pivotal movement of the front seat back toward the easy-enter position, a control belt extending between the support member and the vehicle body slides through a front seat back mounted slide member that is spaced from the pivotal axis of the front seat back. As the control belt slides relative to the front seat back, it acts against the bias of the spring and moves the support member to a position extending generally along the outboard side of the front seat back such that the restraining belt is moved to a generally longitudinally extending easy-enter position without any deliberate occupant effort.

7 Claims, 1 Drawing Figure

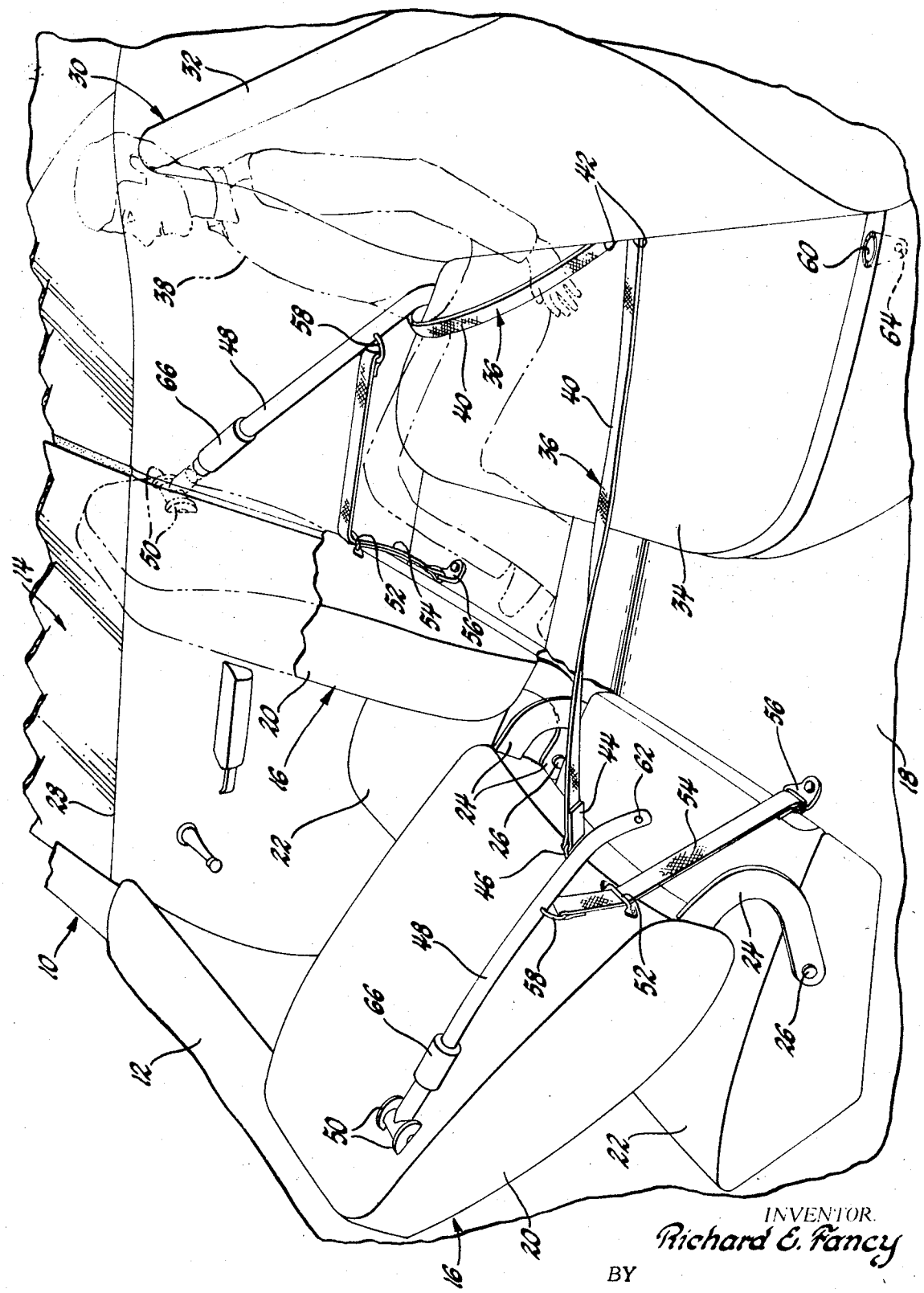

VEHICLE OCCUPANT RESTRAINING BELT ARRANGEMENT

BACKGROUND OF THE INVENTION

This invention relates to vehicle occupant restraining belt arrangements in which restraining belts are moved between occupant restraining positions and easy-enter positions without any deliberate effort on the part of the vehicle occupant.

It is known to provide a vehicle occupant restraining belt arrangement in which a restraining belt is moved between easy-enter and occupant restraining positions relative to a seated occupant in response to opening and closing movement of a vehicle door laterally adjacent the seat. Since the rear seat of a two door type vehicle body is accessible through the front door opening with the front seat back tipped forwardly from the generally vertical seating position to an easy-enter position, a door responsive belt arrangement cannot be used with the rear seat of this type of vehicle body as there is no door laterally adjacent this seat.

SUMMARY OF THE INVENTION

This invention provides a vehicle occupant restraining belt arrangement in which a restraining belt is moved between an easy-enter position and a restraining position relative to a rear seat occupant in response to movement of the front seat back between the seating and easy-enter positions.

In the preferred embodiment of the invention, an elongated support member has one end pivoted to the front seat back and a second end attaching the outboard end of a restraining belt whose inboard end is suitably secured to the vehicle body adjacent an inboard portion of the rear seat. During pivotal movement of the front seat back from the forwardly tipped easy-enter position to the generally vertical seating position, a spring moves the support member to a rearwardly extending position where the second support member end engages an outboard vehicle body portion and disposes the restraining belt in a generally laterally extending restraining position relative to a rear seat occupant. A latch mechanism mounted on the support member includes a bolt selectively engageable with the outboard vehicle body portion such that the support member secures the restraining belt in the restraining position while concomitantly positioning and supporting the front seat back in the seating position. Upon unlatching of the latch mechanism and s subsequent movement of the front seat back toward the forwardly tipped easy-enter position, a control belt extending between the support member and the vehicle body slides through a front seat back mounted member spaced relative to the front seat back pivotal axis. As the control belt slides relative to the front seat back, it acts against the bias of the spring and moves the support member to a position extending generally along the outboard side of the front seat back to move the outboard end of the restraining belt forwardly such that the restraining belt extends generally longitudinally of the vehicle body in an easy-enter position.

Accordingly, one feature of this invention is that it provides a vehicle occupant restraining belt arrangement for the seat of of a two door type vehicle body in which a restraining belt is moved from a generally laterally extending occupant restraining position to a generally longitudinally extending easy-enter position in response to movement of the front seat back from a generally vertical seating position to a generally forwardly tipped easy-enter position. Another feature of the invention is that the restraining belt is moved from the easy-enter position to the occupant restraining position in response to movement of the front seat back from the easy-enter position to the seating position. Another feature of the invention is that an elongated support member has one end secured to the front seat back and a free end attaching the outboard end of the restraining belt, with the forward movement of the front seat back to easy-enter position moving the support member forwardly and the restraining belt to the easy-enter position, and with the rearward movement of the front seat back to the seating position moving the support member rearwardly to engage the free end with an outboard portion of the vehicle body and secure the restraining belt in restraining position while the support member concomitantly positions and supports the front seat back in the seating position. Another feature of the invention is that the one end of the support member is pivoted to the front seat back and the support member is moved about this pivotal connection between a rearwardly extending position where the free end of the support member engages the outboard vehicle body portion and secures the restraining belt in restraining position and a position where the support member extends generally along the outboard side of the front seat back and positions the restraining belt in the easy-enter position. Another feature of the invention is that a spring normally biases the support member to the rearwardly extending position and a control belt extending between the vehicle body and the support member moves the support member against the spring bias to the position along the outboard side of the front seat back during movement of the front seat back to the forwardly tipped easy-enter position. Another feature of the invention is that a slide member mounted on the front seat back in spaced relationship to the pivotal axis thereof slidably receives an intermediate portion of the control belt to produce the pivotal movement of the support member during forward movement of the front seat back to the easy-enter position.

BRIEF DESCRIPTION OF THE DRAWING

The above detailed features and other features of this invention are apparent from the following description of the preferred embodiment and the single FIGURE of the drawing which is a partially broken away perspective view of the occupant compartment in a two door type vehicle body including left and right-hand belt arrangements, according to this invention, for restraining left and right-hand occupants of the rear seat, with the right-hand belt arrangement shown in an occupant restraining position, and with the left-hand belt arrangement shown in an easy-enter position allowing occupant entrance to and egression from the rear seat.

DESCRIPTION OF THE PREFERRED EMBODIMENT

Referring to the drawing, a vehicle body generally indicated by 10 includes an instrument panel 12 adjacent the forward end of an occupant compartment generally indicated by 14. Within the occupant compartment 14, left and right-hand bucket type front seats 16 are mounted on the vehicle floor 18 rearward of instrument panel 12 by conventional seat adjuster mechanisms that are not shown. Front seats 16 include conventional seat backs 20 and seat cushions 22 interconnected by links 24 whose upper ends are fixedly secured relative to the seat backs and whose opposite ends are pivoted to the seat cushions by pins 26. Access to the front seats 16 is through the door openings of left and right-hand front doors 28, only the right-hand door being shown in the drawing. Rearward of the front seats 16, a rear seat generally indicated by 30 is fixedly mounted on the floor 18 and includes a seat back 32 and a seat cushion 34. The front seat backs 20 are conventionally movable about pins 26 from the generally vertical seating position of the right-hand front seat back to the forwardly tipped easy-enter position of the left-hand front seat back to allow occupant access to the rear seat through the openings of doors 28 in a conventional manner.

The rear seat 30 is provided with a pair of symmetrical left and right-hand occupant restraining belt arrangements 36, each of which is according to this invention, for restraining rear seat occupants such as the phantom line indicated right-hand rear seat occupant 38. The belt arrangements include respective lap restraining belts 40 whose inboard ends are received at 42 between the juncture of the seat back 32 and seat cushion 34 and are suitably secured to the vehicle body such as by conventional belt retractors or suitable attachment members. The outboard ends of restraining belts 40 are sewn to themselves to form loops 44, seen only in the left-hand belt arrangement, receiving attachment members 46 suitably secured to the lower or free ends of respective elongated support members 48. The upper ends of support members 48 are received between respective pairs of lugs 50 mounted on the rear sides of upper outboard portions of seat backs 20. The lugs 50 pivotally mount the support members 48 relative to the seat backs 20 for relative movement between the position of the left-hand support member and the position of the right-hand support member. A pair of suitable springs, not shown, respectively extend between the seat backs 20 and the upper ends of support members 48. These springs may be of any suitable configuration such that they normally bias the support members 48 about lugs 50 to the generally rearwardly extending position of the right-hand support member.

A pair of slide members 52 are respectively mounted in a suitable manner on the rear sides of seat backs 20 adjacent the upper ends of the two outboard links 24. Slide members 52 are spaced from the pivotal axis of the seat backs 20 about pins 26 and slidably receive intermediate portions of respective control belts 54. The lower ends of the control belts 54 are secured to the vehicle floor 18 by respective attachment members 56, while their upper ends are secured to the support members 48 by respective attachment members 58. As the seat backs 20 are moved forwardly from the seating position to the easy-enter position, the slide members 52 move away from the attachment members 56 on the floor and cause the intermediate portions of control belts 54 to slide through them and act against the normal spring bias on support members 48. The control belts thus pivot the support members about lugs 50 to a position extending along the outboard rear side of the respective seat backs 20, as shown by the left-hand support member, and position the restraining belts 40 in a generally longitudinally extending easy-enter position without any deliberate occupant effort.

When the seat backs 20 are moved from the forwardly tipped easy-enter position to the generally vertical seating position, the seat back mounted slide members 52 move toward the attachment members 56 and allow the spring bias of support members 48 to slide the control belts 54 relative to the slide members as the support members move to the generally rearwardly extending position shown by the right-hand support member. During this seat back movement, the restraining belts 40 are moved by the support members to an occupant restraining position across the laps of seated occupants without any deliberate occupant effort.

As the seat backs 20 approach the generally vertical seating position, the lower ends of the support members 48 are guidingly received within generally funnel-like apertures 60 in respective outboard portions of the rear seat 30. Bolts 62 mounted on the lower ends of support members 48 are received within suitable apertures 64 opening to the funnel-like apertures 60 to secure the support members in the rearwardly extending position. With the bolts latched as described, the support members 48 secure the restraining belts 40 in the occupant restraining position while concomitantly positioning and supporting the seat backs 20 in the generally vertical seating position. Release members 66 suitably mounted on the respective upper ends of the support members 48 are selectively actuatable by rear seat occupants to release the bolts 62 by a suitable mechanism and allow forward movement of the seat backs to the easy-enter position while the restraining belts 40 are concomitantly moved to the easy-enter position as previously described.

While the embodiment disclosed shows the belt arrangements for use with restraining belts that function as lap belts, it is also possible to provide the arrangement for use with a restraining belt that functions as a shoulder belt, with the inboard belt end secured adjacent an upper portion of the rear seat back such that the shoulder belt extends diagonally across the chest of a rear seat occupant in the restraining position. Likewise, it is possible for the arrangement to include both lap and shoulder belts.

The invention thus provides a vehicle occupant restraining belt arrangement for the rear seat of a two door type vehicle body.

What is claimed is:

1. In combination with a two door type vehicle body including a rear seat with a fixed seat back and a front seat with a seat back movable between a forwardly tipped easy-enter position and a generally vertical seating position, an occupant restraining belt arrangement comprising, belt means including first and second belt ends and a restraining portion therebetween, first attachment means for securing the first belt end adjacent an inboard portion of the rear seat, second attachment means for selectively securing the second belt end adjacent an outboard portion of the rear seat with the restraining portion disposed laterally in a restraining position relative to a rear seat occupant, and seat back mounted control means attached to the second belt end so as to move it forwardly in response to movement of the front seat back to the easy-enter position such that the belt means is disposed in a generally longitudinally extending easy-enter position when the seat back is in its forwardly tipped easy-enter position.

2. In combination with a two door type vehicle body including a rear seat with a fixed seat back and a front seat with a seat back movable between a forwardly tipped easy-enter position and a generally vertical seating position, an occupant restraining belt arrangement comprising, belt means including first and second belt ends and a restraining portion therebetween, first attachment means for securing the first belt end adjacent an inboard portion of the rear seat, second attachment means for selectively securing the second belt end adjacent an outboard portion of the rear seat with the restraining portion disposed laterally in a restraining position relative to a rear seat occupant, and seat back mounted control means attached to the second belt end and responsive to movement of the front seat back to the seating position so as to move the second belt end from a forward position where the belt means is disposed in a generally longitudinally extending easy-enter position to a rearward position where the restraining portion of the belt means is disposed in the restraining position.

3. In combination with a two door type vehicle body including a rear seat with a fixed seat back and a front seat with a seat back movable between a forwardly tipped easy-enter position and a generaly vertical seating position, a passive occupant restraining belt arrangement comprising, belt means including first and second belt ends and a restraining portion therebetween, first attachment means for securing the first belt end adjacent an inboard portion of the rear seat, second attachment means for selectively securing the second belt end adjacent an outboard portion of the rear seat with the restraining portion disposed laterally in a restraining position relative to a rear seat occupant, and seat back mounted control means attached to the second belt end so as to move it in response to movement of the front seat back to the easy-enter position such that the belt means is disposed in a generally longitudinally extending easy-enter position when the seat back is in its forwardly tipped easy-enter position, the seat back mounted control means also moving the second belt end rearwardly and the restraining portion of the belt means to the restraining position in response to movement of the front seat back to the seating position.

4. In combination with a two door type vehicle body including a rear seat with a fixed seat back and a front seat with a seat back movable between a forwardly tipped easy-enter position and a generally vertical seating position, a passive occupant restraining belt arrangement comprising, belt means including first and second belt ends and a restraining portion therebetween, first attachment means for securing the first belt end adjacent an inboard portion of the rear seat, elongated support means with one end secured to the front seat back and a second end engageable with the vehicle body adjacent an outboard portion of the rear seat, latch means for selectively securing the second end of the support means to the vehicle body such that the support means positions and supports the front seat back in the seating position, and second attachment means securing the second end of the belt means to the support means adjacent the second end thereof to dispose the belt means in an occupant restraining position relative to a rear seat occupant when the front seat back is in the seating position, the support means moving the second end of the belt means forwardly during movement of the front seat back toward the easy-enter position to dispose the belt means in a generally longitudinally extending easy-enter position.

5. In combination with a two door type vehicle body including a rear seat with a fixed seat back and a front seat with a seat back movable between a forwardly tipped easy-enter position and a generally vertical seating position, a passive occupant restraining belt arrangement comprising, belt means including first and second belt ends and a restraining portion therebetween, first attachment means for securing the first belt end adjacent an inboard portion of the rear seat, elongated support means having one end pivoted to the front seat back and movable thereabout between a first position extending generally adjacent the rear side of the front seat back and a second position extending generally rearwardly from the front seat back for engagement with the vehicle body adjacent an outboard portion of the rear seat when the front seat back is in the seating position, latch means for selectively securing the support means to the vehicle body such that the support means positions and supports the front seat back in the seating position, second attachment means securing the second end of the belt means to dispose the belt means in a restraining position relative to a rear seat occupant when the front seat back is in the seating position and the support means is in the second position, means for moving the support means to the first position during movement of the front seat back toward the easy-enter position to move the second end of the belt means forwardly and position the belt means in a generally longitudinally extending easy-enter position, and means for moving the support means to the second position during movement of the front seat back toward the seating position to move the belt means to the restraining position.

6. In combination with a two door type vehicle body including a rear seat with a fixed seat back and a front seat with a seat back pivotally movable between a forwardly tipped easy-enter position and a generally vertical seating position, a passive occupant restraining belt arrangement comprising, restraining belt means including first and second belt ends and a restraining portion therebetween, first attachment means for securing the first belt end adjacent an inboard portion of the rear seat, elongated support means having one end pivoted to an outboard portion of the front seat back and movable thereabout between a first position extending generally adjacent the outbaord side of the front seat back and a second position extending generally rearwardly from the front seat back for engagement with the vehicle body adjacent an outboard portion of the rear seat when the front seat back is in the seating position, means biasing the support means toward the second position, latch means for selectiely securing the support means to the vehicle body such that the support means positions and supports the front seat back in the seating position, second attachment means securing the second end of the restraining belt means to the support means to dispose the restraining belt means in a generally laterally extending restraining position relative to a rear seat occupant when the front seat back is in the seating position and the support means is in the second position, and control belt means extending between the vehicle body and the support means and moving the support means to the first position during movement of the front seat back toward the easy-enter position to move the second end of the restraining belt means forwardly and position the restraining belt means in a generally longitudinally extending easy-enter position, the control belt means allowing the biasing means to move the support means to the second position and the restraining belt means to the restraining position during movement of the front seat back to the seating position.

7. The combination of claim 6 wherein the control belt means includes an intermediate belt portion slidable over a slide portion of the front seat back positioned in spaced relationship to the pivotal axis of this seat back.

* * * * *

PO-1050
(5/69)

UNITED STATES PATENT OFFICE
CERTIFICATE OF CORRECTION

Patent No. 3,749,418          Dated July 31, 1973

Inventor(s) Richard E. Fancy

It is certified that error appears in the above-identified patent and that said Letters Patent are hereby corrected as shown below:

Column 1, line 64, after "the" insert --rear--. Column 5, line 34, after "it" insert --forwardly--. Column 6, line 21, after "means" insert --to the support means--.

Signed and sealed this 12th day of March 1974.

(SEAL)
Attest:

EDWARD M. FLETCHER, JR.
Attesting Officer

C. MARSHALL DANN
Commissioner of Patents